(12) United States Patent
Kelly et al.

(10) Patent No.: US 6,441,773 B1
(45) Date of Patent: Aug. 27, 2002

(54) WEATHER RADAR SYSTEM INTEGRATING GROUND-BASED WEATHER RADAR WITH ON-BOARD AIRCRAFT WEATHER RADAR

(75) Inventors: Wallace E. Kelly; Timothy W. Rand, both of Cedar Rapids, IA (US); Serdar Uckun, Palo Alto; Corinne C. Ruokangas, Woodside, both of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/645,085

(22) Filed: Aug. 24, 2000

(51) Int. Cl.[7] .............................. G01S 13/95; G01S 7/06
(52) U.S. Cl. .............................. 342/26; 342/52; 342/58; 342/175; 342/176; 342/195; 340/945
(58) Field of Search ........................ 340/945; 342/26, 342/52, 58, 175–186, 195

(56) References Cited

U.S. PATENT DOCUMENTS 5,805,100 A * 9/1998 Becker et al. ................ 342/26
6,043,756 A * 3/2000 Bateman et al. ............. 340/945

OTHER PUBLICATIONS

Co–pending patent application Docket No. 00CR036/KE entitled "A Retrofit Solution For The Integration Of Ground–Based Weather Radar Images With On–Board Weather Radar" filed on an even date, inventor W. Kelly, Serial No. 09/645666, Filed Aug. 24, 2000.

* cited by examiner

Primary Examiner—Bernarr E. Gregory
(74) Attorney, Agent, or Firm—Nathan O. Jensen; Kyle Eppele

(57) ABSTRACT

A radar displaying system and method for use in displaying weather radar information on a cockpit display of an aircraft receives on-board weather radar information from an on-board weather radar system and ground-based weather radar information up-linked to the aircraft from a ground-based weather radar system. The information from the on-board weather radar system and the information from the ground-based weather radar system are combined to generate composite weather radar information. In response to the composite information, the cockpit display simultaneously displays both on-board weather radar imagery and ground-based weather radar imagery.

22 Claims, 8 Drawing Sheets

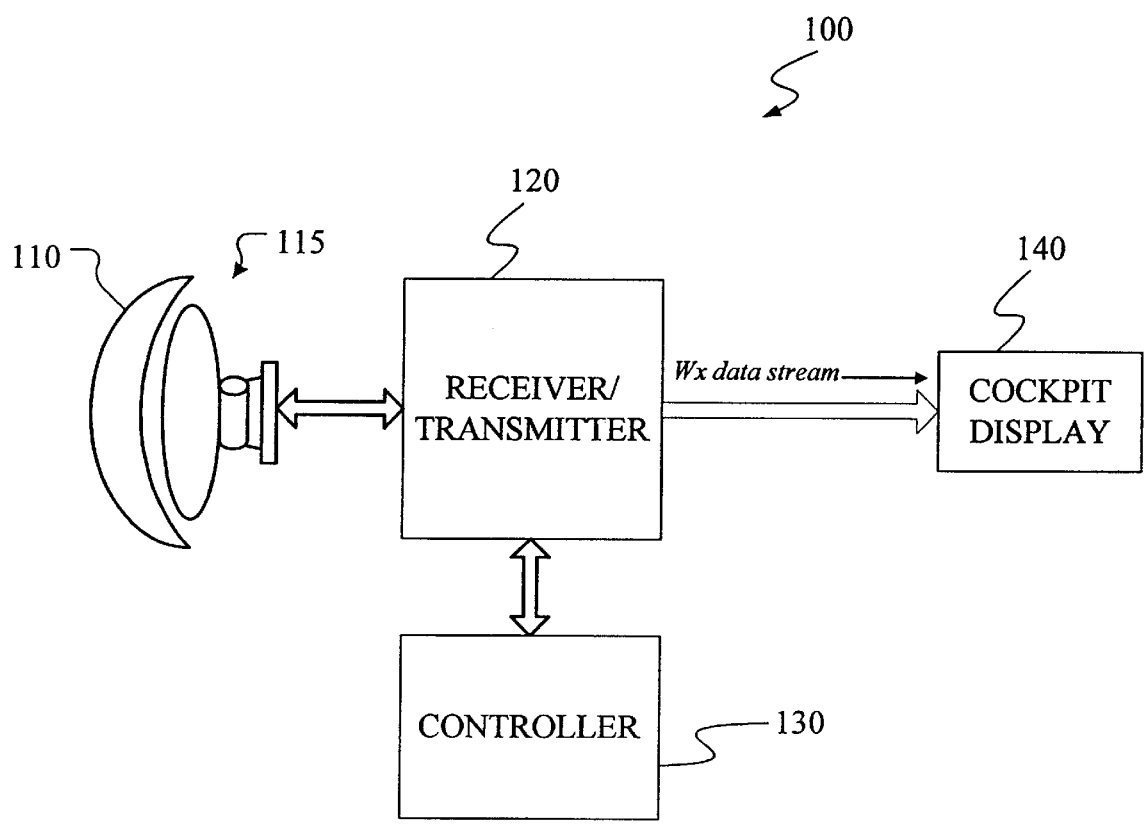
PRIOR ART
FIG. 1

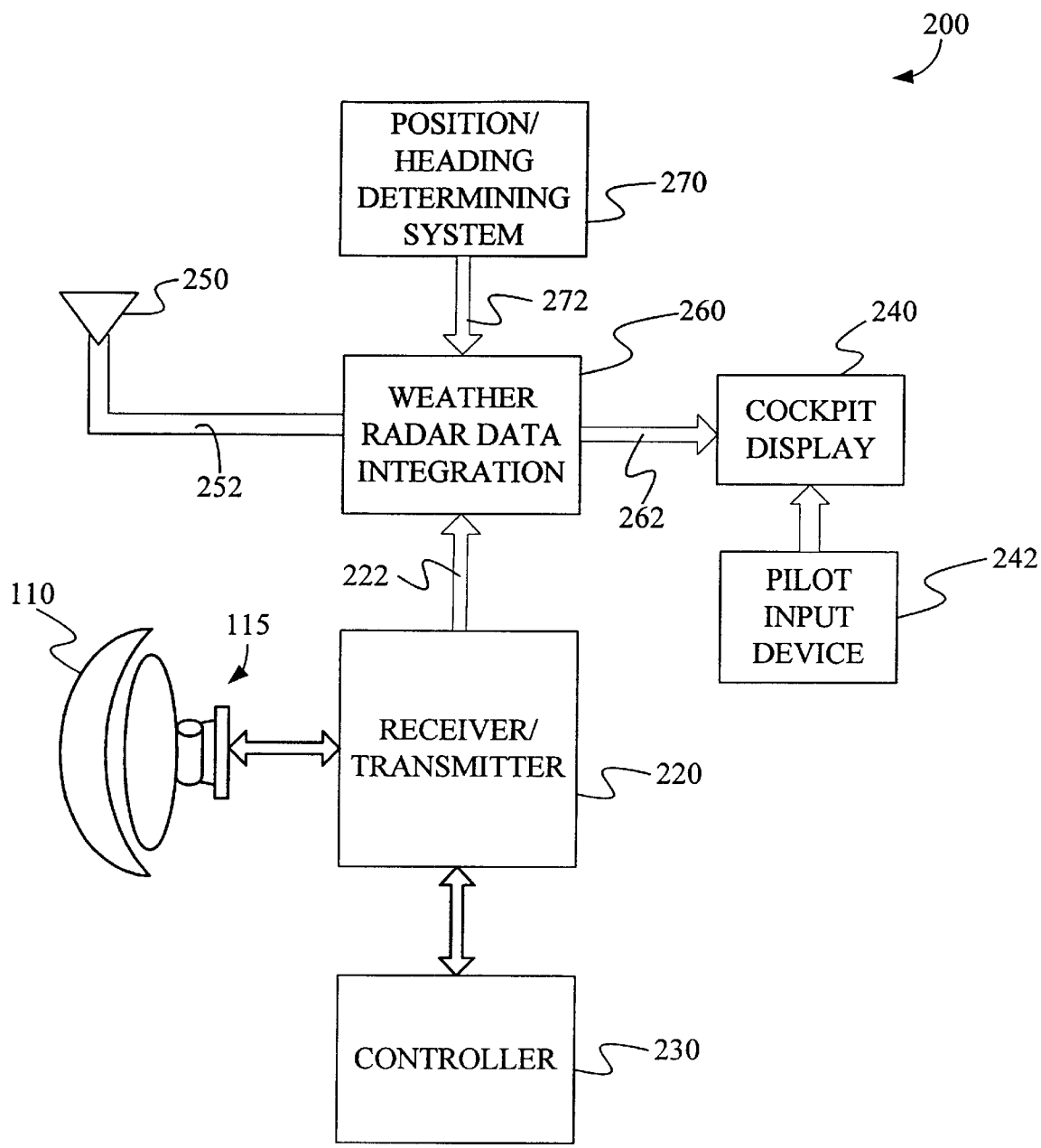
FIG. 2

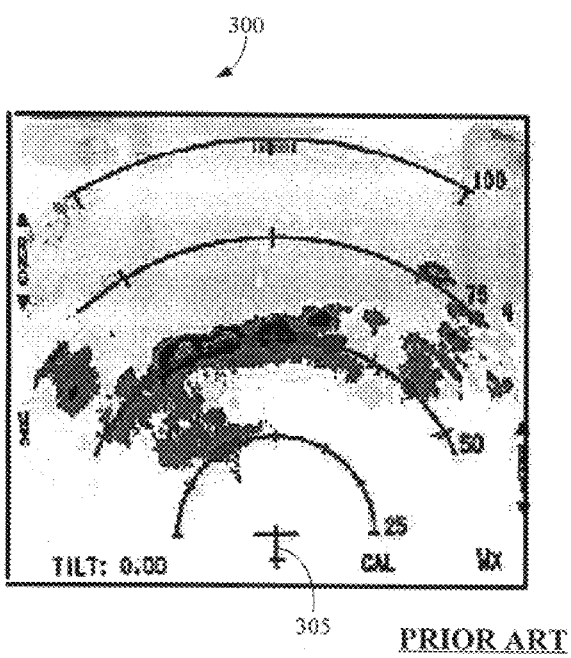
PRIOR ART
FIG. 3A
PRIOR ART
FIG. 3B

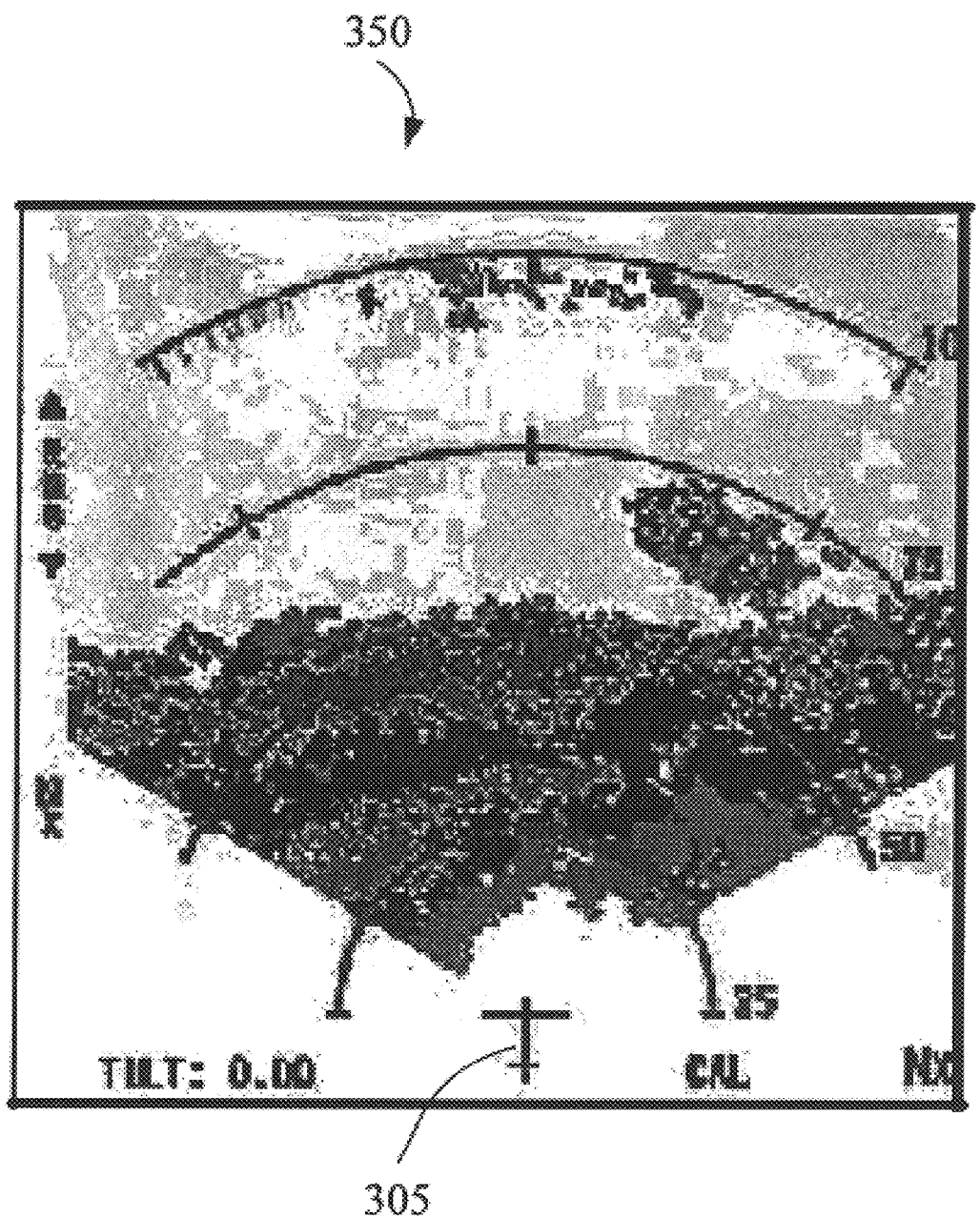
FIG. 4A

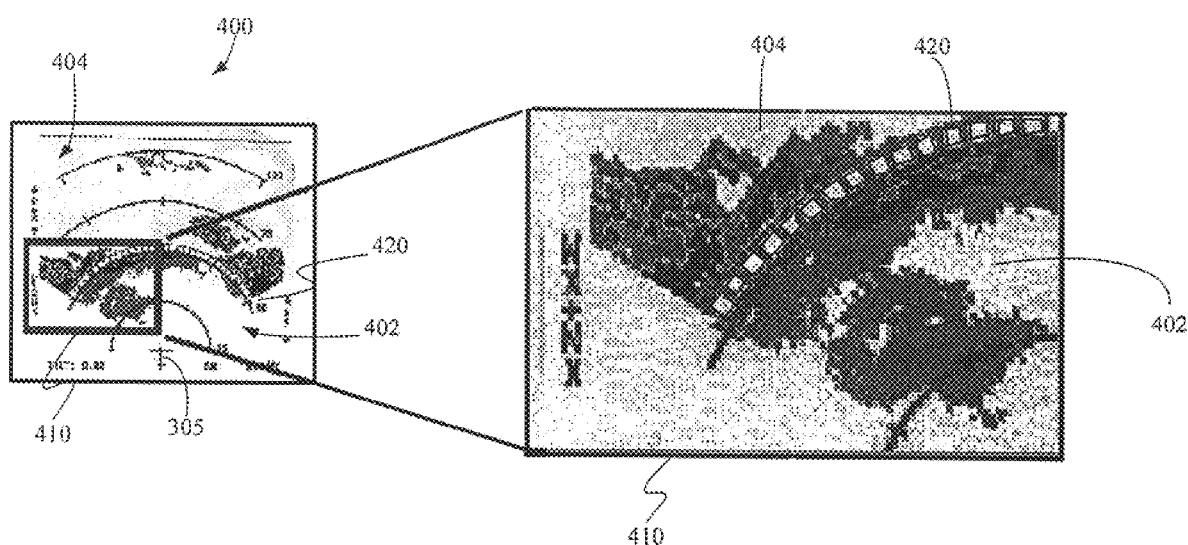
FIG. 4B

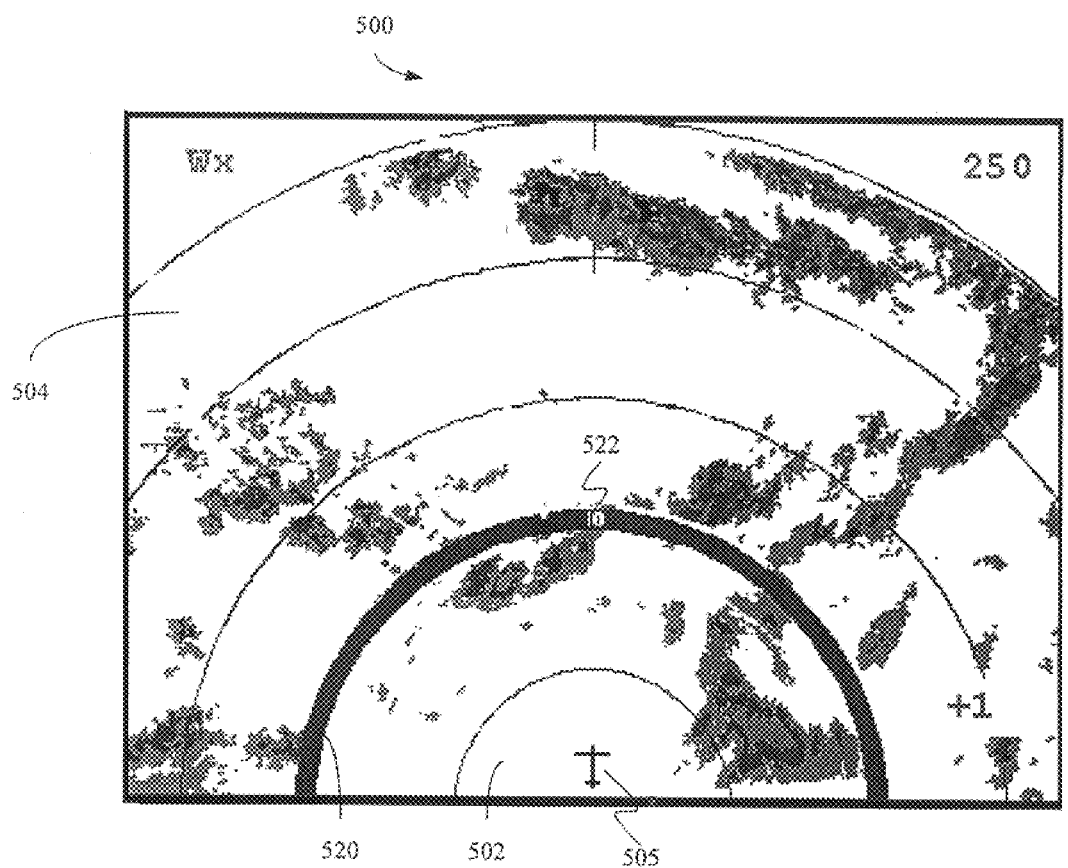
FIG. 5A

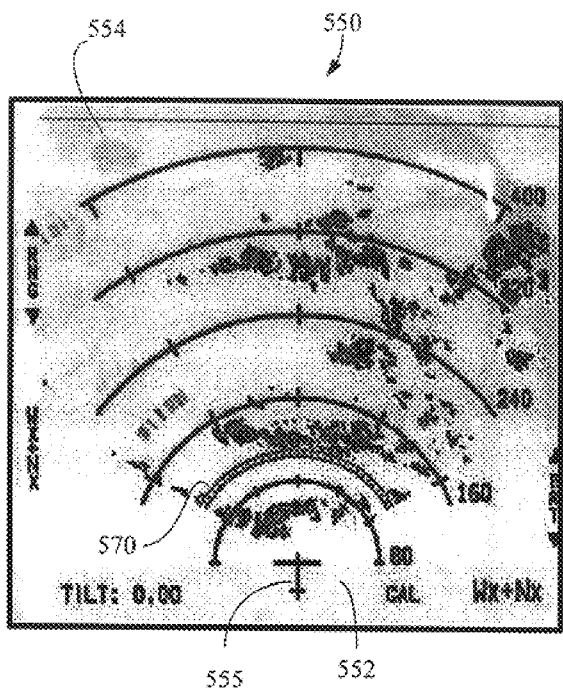 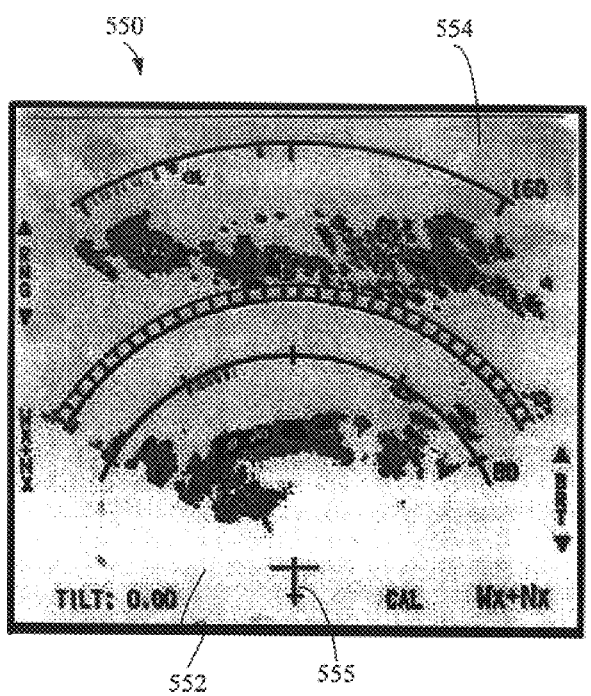
FIG. 5B FIG. 5C

SAMPLE COLOR MAPPING

| NEXRAD | Approx. Reflectivity [dBZ] | Color |
|---|---|---|
| 0-3 | < 20 | Black |
| 4-5 | 20 < dBZ < 30 | Green |
| 6-7 | 30 < dBZ < 40 | Yellow |
| 8-15 | > 40 | Red |

TABLE 1

FIG. 6

WEATHER RADAR SYSTEM INTEGRATING GROUND-BASED WEATHER RADAR WITH ON-BOARD AIRCRAFT WEATHER RADAR

CROSS-REFERENCE TO RELATED APPLICATIONS

Reference is made to a co-pending and commonly assigned patent application entitled A RETROFIT SOLUTION FOR THE INTEGRATION OF GROUND-BASED WEATHER RADAR IMAGES WITH ON-BOARD WEATHER RADAR, Ser. No. 09/645,666, filed Aug. 24, 2000, which is herein incorporated by reference in its entirety.

FIELD OF THE INVENTION

The present invention relates to on-board weather radar for use on aircraft or other vehicles. More particularly, the present invention relates to methods and apparatus for providing ground-based weather radar information to a pilot using on-board weather radar cockpit displays.

BACKGROUND OF THE INVENTION

Weather has been identified as a cause or contributing factor to nearly 25% of aviation accidents and 35% of fatalities. Accidents occur when a chain of events leads to a failure of an aircraft system, a mistake on part of the crew piloting the aircraft, or a combination thereof. Improved levels of weather information and the use of pilot decision aids may be helpful in breaking the chain of events that leads to an accident.

In addition to creating hazardous situations, weather is a common cause of flight delays. For example, in the United States, more than 70% of delays are attributed to weather conditions. While the industry will always have some level of delay caused by extreme weather, there is a growing belief that improved weather information in the cockpit could improve efficiency for the overall system.

On-board weather radar is a tactical navigation aid that shows convective hazards for the next 15 to 30 minutes of flight. The on-board weather radar currently serves as the focus of a pilot's awareness of the weather situation. It provides a graphical depiction of precipitation relative to the aircraft's position. The presence of turbulence can be inferred from these reflections off of precipitation. Through the use of Doppler processing, turbulence can also be detected and displayed directly.

While the on-board weather radar has proven invaluable as a real-time source of tactical weather information, the range is limited. Additionally, the beam width of on-board weather radar increases significantly at longer ranges, making it difficult to perform fine resolution of precipitation patterns.

To enhance safety and efficiency, government and industry are attempting to improve the availability and quality of weather information available to flight crews. It is desirable to provide flight crews with weather information which has been up-linked from a ground-based weather radar system. One such ground-based weather radar system is the Next Generation Weather Radar (NEXRAD) system, the data from which is available via the Internet or other sources. These ground-based weather radar systems offer a strategic view of weather over a larger region than possible with on-board weather radar. The NEXRAD system includes ground-based radar sites distributed across the continental United States. The NEXRAD system is used to create a series of weather products, including base reflectivity, composite reflectivity, hail indices, and storm tracking information, to name a few. Generally, NEXRAD provides an excellent strategic view of the weather situation, but would likely suffer in cockpit applications from latencies due to acquisition, processing and up link.

The pilot community has expressed interest in up-linking ground-based radar images, like those available from NEXRAD, to the cockpit as has been proposed. Several industry-led programs have focused on development of applications for displaying these images in the cockpit of an aircraft. However, as mentioned earlier, these images suffer in cockpit applications from latencies due to acquisition, processing and up-link. On the other hand, the on-board weather radar images do not suffer from latencies but are of limited range. Consequently, a method that utilizes the benefits of both of these two sources would be a significant improvement in the art.

SUMMARY OF THE INVENTION

A radar displaying system and method for use in displaying weather radar information on a cockpit display of an aircraft receiving on-board weather radar information from an on-board weather radar system and ground-based weather radar information up-linked to the aircraft from a ground-based weather radar system. The information from the on-board weather radar system and the information from the ground-based weather radar system are combined to generate composite weather radar information. In response to the composite information, the cockpit display simultaneously displays both on-board weather radar imagery and ground-based weather radar imagery.

BRIEF DESCRIPTION OF THE DRAWINGS

FIG. 1 is a block diagram illustrating a prior art on-board weather radar system.

FIG. 2 is a block diagram illustrating an on-board weather radar system in accordance with the invention which integrates on-board weather radar data with up-linked weather radar data from a ground-based system.

FIG. 3A is an illustration of prior art on-board weather radar imagery.

FIG. 3B is an illustration of prior art ground-based weather radar imagery.

FIG. 4A is an illustration of the display of ground-based weather radar imagery on an on-board weather radar cockpit display in accordance with the present invention.

FIG. 4B is an illustration of a composite of on-board and ground-based weather radar imagery in accordance with the present invention.

FIGS. 5A–5C are illustrations of the composite on-board and ground-based weather radar imagery provided by weather radar systems of the present invention.

FIG. 6 is a table illustrating color mapping between ground-based weather radar and on-board weather radar in accordance with some embodiments of the invention.

DETAILED DESCRIPTION OF AN ILLUSTRATIVE EMBODIMENT

FIG. 1 is a block diagram illustrating a prior art weather radar system 100. System 100 includes radome 110, antenna (shown with mount) 115, receiver/transmitter 120, controller 130 and cockpit display 140. Under the control of controller 130, receiver/transmitter 120 transmits a radar pulse through antenna 115 and radome 110 in one particular direction at a time. The radar pulse travels outward from the aircraft in the particular direction and reflects off of precipitation or other weather phenomena. As reflections come back and are received by antenna 115 and receiver/transmitter 120, an indication of the weather at different distances (out to a range) along a straight line in the particular direction can be ascertained. The data that is received by receiver/transmitter 120 is put into a data stream and provided to cockpit display 140 for displaying weather radar information to the pilot. As antenna 115 sweeps back and forth, data for hundreds of these "radials" are obtained every sweep, thus providing a complete picture of the weather in front of the aircraft. A radial can be defined as weather radar information along a line, out to a range, for a given tilt angle and scan angle from the aircraft as is known in the art.

In conventional on-board weather radar systems, the data that is received is frequently put into an ARINC 453 weather radar data structure, for example ARINC CHARACTERISTIC 708A. Each word of this data structure includes data representing the intensity of the weather at a multiplicity of points along the straight line of a radial out to a range, which is typically no greater than about 100 miles. The intensity data for each of the points represented in the ARINC 453 word is stored in range bins of the word. The ARINC 453 word also includes header information indicative of the range and direction for the radial.

FIG. 3A is a representation of an on-board weather radar image 300 of the type which is typically displayed by cockpit display 140 of system 100 shown in FIG. 1. Based upon the color of different pixels or areas shown in image 300, the pilot of the aircraft (aircraft represented graphically at 305) can determine the intensity and direction of weather conditions or phenomena ahead of the aircraft. As shown in FIG. 3A, on-board weather radar typically provides an accurate indication of weather conditions to a range of approximately 100 miles from the aircraft. Given the high travel speeds which are typical of many aircraft, this can represent as little as ten or fifteen minutes of travel.

FIG. 3B illustrates ground-based weather radar image 320 which is available from a weather information service provider. Image 320 represents a prior art NEXRAD bit map or graphical representation of weather.

FIG. 2 is a block diagram illustrating weather radar system 200 adapted for use on an aircraft in accordance with the present invention. Weather radar system 200 combines on-board weather radar information with up-linked, ground-based weather radar information, displaying them simultaneously on the same display. This provides pilots with both real-time tactical information and longer-range strategic views. As will be discussed below in greater detail, the concept is applicable to dedicated weather radar indicators, to existing Electronic Flight Instrument PATENT System (EFIS) based weather radar displays, and to yet to be developed display hardware. Further, in some embodiments, weather radar system 200 is adapted to provide ground-based weather radar images (for example see FIG. 4A), without being integrated on-board weather radar images, on these existing indicators or displays.

Referring back to embodiments in which on-board weather radar information is displayed simultaneously with ground-based weather radar information on the same indicator, the co-display of the two radar images utilizes the strengths of the two sources of information. The on-board radar provides a real-time view of the weather within close range to the aircraft—where the pilot needs real-time information. The NEXRAD (or other ground-based radar) data, on the other hand, cannot be considered real-time for this aviation application. There are delays due to the time required in processing, distributing and transmitting the data. However, NEXRAD data can be displayed for the longer ranges, providing information beyond the range of the on-board radar. At these ranges, the age of the data is not as critical.

System 200 includes radome 110, antenna 115, receiver/transmitter 220, controller 230, cockpit display 240, pilot input device 242, data link or communication system 250, and weather radar data integration circuitry 260. System 200 also utilizes position/heading information provided from a position/heading determining system 270, which can be for example a Global Positioning System (GPS) receiver.

Controller 230, receiver/transmitter 220 and antenna 115 function substantially or identically to the manner in which the similar components in system 100 function. Thus, under the control of controller 230, receiver/transmitter 220 sequentially transmits pulses through antenna 115 in each of a large number of directions to obtain information 222 for multiple radials required to produce an on-board weather radar image such as image 300 shown in FIG. 3A. This information 222 is provided to weather radar data integration circuitry 260, which can be a suitably programmed processor or other circuitry. As will be discussed below in greater detail, integration circuitry 260 can be existing circuitry, in retrofit radar systems, adapted or programmed to implement the functions of the present invention.

Data link 250 is a communication system which is adapted to receive up-linked weather radar data 252 from a ground-based weather radar system and to provide this ground-based weather radar data to weather radar data integration circuitry 260. For example, the up-linked ground-based weather radar data can be received from a ground-based transmitter which obtains the weather radar data from the internet or from other sources. In exemplary embodiments, the ground-based weather radar information 252 includes data representative of a NEXRAD image in a format such as the bit map (BMP) or Graphic Interchange Format (GIF) formats. FIG. 3B illustrates an image 320 of this type.

Using position and heading information 272 provided by position/heading determining system 270, weather radar data integration circuitry 260 determines the relevant portion of the up-linked ground-based weather radar data 252 for the current position and heading of the aircraft. In other words, based on the position and heading of aircraft 305, data integration circuitry 260 can extract from the total up-linked ground-based weather radar data 252 the portions corresponding to the radials obtained by the on-board radar (see FIG. 3A). However, these portions will typically extend to a range beyond the range obtained by the on-board radar system, and only data corresponding to selected ranges need be identified.

Data integration circuitry 260 combines the on-board weather radar data 222 with the ground-based weather radar data 252 and produces composite weather radar data 262 which is provided to cockpit display 240. Using composite weather radar data 262, cockpit display 240 provides display images such as image 400 shown in FIG. 4B. As can be seen in FIG. 4B, using data 262, cockpit display 240 displays composite radar image 400 with both on-board weather radar imagery 402 and ground-based weather radar imagery 404 shown together relative to a position of the aircraft represented at 305. The on-board weather radar imagery 402 illustrates weather information for positions which are closer to the aircraft, while ground-based weather radar imagery 404 illustrates weather information at positions further from the position of the aircraft.

Pilot input device 242 is used by the pilot to control cockpit display 240. For example, using input device 242, the pilot can change the range of displayed information. Simultaneously providing on-board weather radar imagery for the near ranges and ground-based weather radar imagery for the outer ranges, on a single weather radar cockpit display, is a highly beneficial tool for the pilot of the aircraft. In some embodiments, input device 242 can be used to control cockpit display 240 such that only ground-based weather radar imagery is shown. FIG. 4A is an illustration of the display on cockpit display 240 of only ground-based weather radar imagery 350 in accordance with the these embodiments of the present invention. If the on-board radar system is adapted to utilize a pre-existing data structure, such as the ARINC 453 data structure, ground-based weather radar imagery 350 can be provided by encoding ground-based weather radar data 252 onto a ARINC 453 data bus. It must be noted that the present invention is not limited to ARINC 453 data bus embodiments.

The images shown in FIGS. 3A and 4A represent the same weather pattern, with image 300 (FIG. 3A) showing the weather pattern as determined from on-board radar and image 350 (FIG. 4A) representing the weather pattern as determined from ground-based radar. As can be seen, the ground-based radar provides greater weather detail at certain ranges. In this example, the aircraft was flying at 22,000 feet. By comparing FIGS. 3A and 4A, it can be seen that the NEXRAD image 350 includes precipitation which is underneath the view of the on-board radar. Also, notice that as the range increases outward, the on-board radar detects more of the precipitation shown in the NEXRAD image. This is due to the increasing beam width of the on-board radar as a function of distance from the aircraft. Since the NEXRAD image 350 provides weather information which is not available in the on-board radar image 300, it is desirable to provide this information to the pilot of the aircraft. However, as discussed previously, limited panel real estate in the cockpit of most aircraft renders it difficult to install new displays which support bitmap type images such as are typically used to display NEXRAD images in non-aviation environments. Therefore, the methods of the present invention which allow ground-based weather radar information and on-board weather radar information to be displayed using the same cockpit displays are highly desirable.

Referring back to FIG. 4B, also illustrated in greater detail is portion 410 of image 400. As can be seen more clearly in portion 410 which is enlarged for ease of illustration, image 400 includes delineating symbology or graphical separator 420 positioned between on-board weather radar imagery 402 and ground-based weather radar imagery 404. Separator 420 provides an indication, which is quickly discernable by the pilot of the aircraft, of which portions of display image 400 correspond to on-board weather radar imagery 402 and which portions correspond to ground-based weather radar imagery 404.

FIGS. 5-A, 5-B and 5-C provide additional illustrations of composite radar images which can be displayed on cockpit display 240 in accordance with the present invention. In FIG. 5A, composite image 500 is shown, with on-board weather radar imagery 502 shown in the lower central regions of the image, and with the ground-based radar imagery 504 shown in the upper and outer portions of the image. In this embodiment, delineating symbology 520, which separates imagery 502 from imagery 504, is a solid line instead of a dashed line. Also, as shown in FIG. 5A, symbology 520 can include data 522 indicating the age of the ground-based weather radar data. Data 522 can be positioned on or in close proximity to symbology 520 as illustrated, or can be positioned elsewhere on image 500.

FIGS. 5B and 5C illustrate image 550 showing composite weather radar information at two separate ranges relative to a position of the aircraft (reference at 555). In FIG. 5B, on-board weather radar imagery 552 is shown relative to ground-based weather radar imagery 554, with the total range of composite weather radar information extending to approximately 400 miles. As can be seen by the position of delineating symbology 570, the range of the on-board weather radar information is approximately 100 miles out of the 400 mile total range. This view provides the pilot of the aircraft with greater long-range strategic weather information.

In contrast, in FIG. 5C, the same image 550 is shown, but with the range limited to approximately 160 miles. Thus, in the view shown in FIG. 5C, the portion of screen of cockpit display 240 used to show on-board weather radar imagery 552 increase, while the portion of the cockpit display screen used to illustrate ground-based weather radar imagery 554 decreases. Thus, this view provides the pilot with more detailed short-range tactical weather radar information. Generally, the pilot of the aircraft would control the total composite range, and thereby control the short-range and long-range weather radar data detail, using a pilot input device 242 (shown in FIG. 2). Further, in some embodiments of the present invention, the pilot uses input device 242 to control not only the total range of the composite radar image, but also the total range of the on-board radar portion of the image. At one extreme, the pilot can reduce the range of displayed on-board radar data to zero such that the cockpit display displays only ground-based radar data, for example as shown in FIG. 4A.

An important issue which must be addressed in the combining of ground-based weather radar data with on-board weather radar data relates to color mapping. Ground-based weather products often use a different color standard than that used in airborne radar. However, many experts suggest that the colors (for example black, green, yellow and red) of the radar image should represent the same thing for the pilot, regardless of the source. In one embodiment of the present invention, the sixteen NEXRAD intensity (color) levels are mapped to the four colors (black, green, yellow and red) of an exemplary conventional on-board weather radar system. The mapping in this embodiment can be accomplished using the relationships illustrated in Table 1 shown in FIG. 6.

The mapping specified in Table 1 causes loss of some of the information originally contained in the NEXRAD (or other ground-based weather radar) image. However, by making this conversion on the ground, prior to transmission to the aircraft, the bandwidth requirements for the up-linked images can be halved. Thus, by converting prior to transmission, each pixel will require two bits of data, rather than four bits. By using a compression method, like run-length encoding, the bandwidth requirements can be reduced even further.

Although the present invention has been described with reference to illustrative embodiments, workers skilled in the art will recognize that changes may be made in form and detail without departing from the spirit and scope of the invention.

What is claimed is:

1. A method of displaying weather radar information on an aircraft's cockpit display, the method comprising:
   receiving on-board weather radar information from an on-board weather radar system;
   receiving ground-based weather radar information up-linked to the aircraft a ground-based weather radar system; integrating, on the aircraft, the on-board weather radar information and the ground-based weather radar information; and
   displaying simultaneously on the cockpit display both on-board weather radar imagery generated as a function of the on-board weather radar information and ground-based weather radar imagery generated as a function of the ground-based weather radar information.

2. The method of claim 1, wherein displaying simultaneously both the on-board weather radar imagery and the ground-based weather radar imagery further comprises displaying on the cockpit display the on-board weather radar imagery for ranges nearer to the aircraft, and displaying on the cockpit display the ground-based weather radar imagery for ranges farther from the aircraft.

3. The method of claim 2, wherein displaying simultaneously both the on-board weather radar imagery and the ground-based weather radar imagery further comprises displaying on the cockpit display a graphical representation of a position of the aircraft, displaying the on-board weather radar imagery on portions of the cockpit display which are proximate the graphical representation of the position of the aircraft, and displaying the ground-based weather radar imagery on portions of the cockpit display which are separated from the graphical representation of the position of the aircraft by the on-board weather radar imagery.

4. The method of claim 3, wherein the step of displaying further comprises displaying delineating symbology between the on-board weather radar imagery and the ground-based weather radar imagery.

5. The method of claim 4, wherein displaying the delineating symbology further comprises displaying a line between the on-board weather radar imagery and the ground-based weather radar imagery.

6. The method of claim 5, wherein displaying the line further comprises displaying a dashed line between the on-board weather radar imagery and the ground-based weather radar imagery.

7. The method of claim 4, and further comprising displaying a numeric representation of an ending range of the on-board weather radar imagery and of a beginning range of the ground-based weather radar imagery.

8. The method of claim 1, and prior to receiving the ground-based weather radar information further comprising:
   converting each of a first plurality of colors representing different weather intensities in the ground based weather radar information into a first color in the on-board weather radar information;
   converting each of a second plurality of colors representing different weather intensities in the ground based weather radar information into a second color in the on-board weather radar information;
   converting each of a third plurality of colors representing different weather intensities in the ground based weather radar information into a third color in the on-board weather radar information; and
   converting each of a fourth plurality of colors representing different weather intensities in the ground based weather radar information into a fourth color in the on-board weather radar information.

9. The method of claim 1, wherein the step of receiving ground-based weather radar information up-linked to the aircraft further comprises receiving NEXRAD weather radar images.

10. The method of claim 1, wherein the step of receiving ground-based weather radar information up-linked to the aircraft from a ground-based weather radar system further includes receiving run-length encoded data to reduce uplink bandwidth requirements and on-board storage requirements of the up-linked data.

11. A system for displaying weather radar information to a pilot of an aircraft, the system comprising:
   an on-board weather radar system positioned on the aircraft and providing on-board weather radar information;
   a data link positioned on the aircraft and adapted to receive ground-based weather radar information up-linked to the aircraft from a ground-based weather radar system;
   weather radar integration circuitry positioned on the aircraft and coupled to the on-board weather radar system and to the data link, the data integration circuitry being adapted to receive the on-board weather radar information and the ground-based weather radar information and to generate in response composite weather radar data; and
   a cockpit display coupled to the data integration circuitry, the cockpit display being adapted to receive the composite weather radar data and in response to simultaneously display both on-board weather radar imagery and ground-based weather imagery.

12. The system of claim 11, wherein the cockpit display simultaneously displays the on-board weather radar imagery for ranges nearer to the aircraft and the ground-based weather radar imagery for ranges farther from the aircraft.

13. The system of claim 12, wherein the cockpit display further displays a graphical representation of a position of the aircraft, and wherein the cockpit display displays the on-board weather radar imagery on portions of the cockpit display which are proximate the graphical representation of the position of the aircraft by the on-board weather radar imagery.

14. The system of claim 13, further comprising delineating symbology that is displayed on the cockpit display between the on-board weather radar imagery and the ground-based weather radar imagery in response to the composite weather radar data.

15. The system of claim 14, wherein the delineating symbology further comprises a line displayed between the on-board weather radar imagery and the ground-based weather radar imagery.

16. The system of claim 15, wherein the delineating symbology further comprises a dashed line displayed between the on-board weather radar imagery and the ground-based weather radar imagery.

17. The system of claim 14, further comprising a numeric representation of an ending range of the on-board weather radar imagery and of a beginning range of the ground-based weather radar imagery, said numeric representation being displayed in response to the composite weather radar data.

18. The system of claim 11, wherein the ground based weather radar system is the NEXRAD system.

19. A method of displaying weather radar information on an aircraft's cockpit display, the method comprising:
   receiving on-board weather radar information from an on-board weather radar system;

receiving ground-based weather radar information up-linked to the aircraft from a ground-based weather radar system, including receiving run-length encoded data to reduce uplink bandwidth requirements and on-board storage requirements of the up-linked data; and displaying simultaneously on the cockpit display both on-board weather radar imagery generated as a function of the on-board weather radar information and ground-based weather radar imagery generated as a function of the ground-based weather radar information.

20. A method of displaying weather radar information on an aircraft's cockpit display, the method comprising:

receiving on-board weather radar information from an on-board weather radar system;

receiving ground-based weather radar information up-linked to the aircraft from a ground-based weather radar system; and displaying simultaneously on the cockpit display both on-board weather radar imagery generated as a function of the on-board weather radar information and ground-based weather radar imagery generated as a function of the ground-based weather radar information, wherein displaying simultaneously both the on-board weather radar imagery and the ground-based weather imagery further comprises displaying on the cockpit display a graphical representation of a position of the aircraft, displaying the on-board weather radar imagery on portions of the cockpit display which are proximate the graphical representation of the position of the aircraft, and displaying the ground-based weather radar imagery on portions of the cockpit display which are separated from the graphical representation of the position of the aircraft by the on-board weather radar imagery.

21. The method of claim 20, wherein the step of displaying further comprises displaying delineating symbology between the on-board weather radar imagery and the ground-based weather radar imagery.

22. The method of claim 20, further comprising displaying on the cockpit display the age of the ground-based weather radar information.

* * * * *